J. M. WALL AND C. MELDRUM.
TAPER AND ANGLE GAGE.
APPLICATION FILED APR. 23, 1917.
1,384,221.
Patented July 12, 1921.
3 SHEETS—SHEET 2.
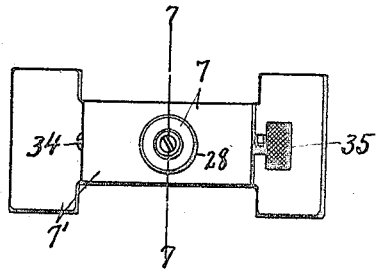
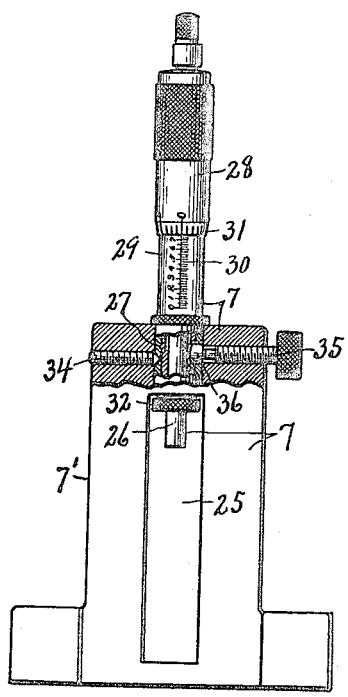
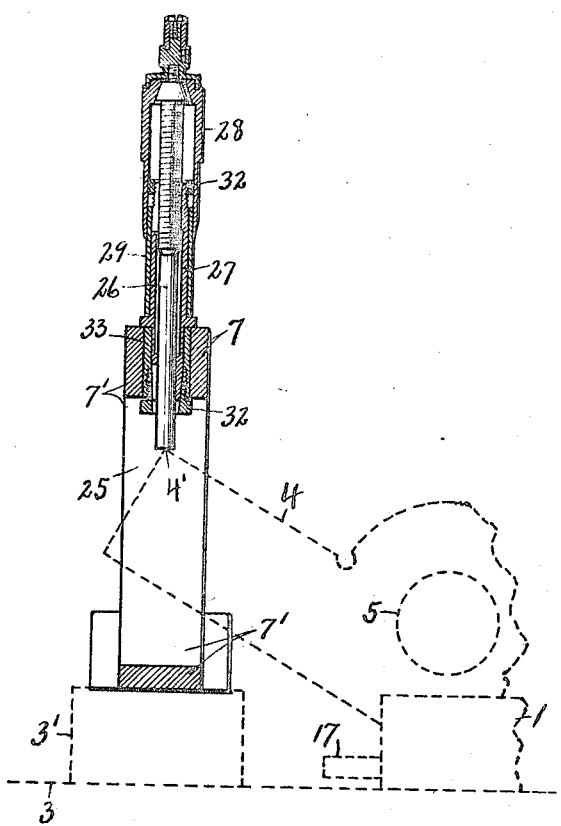

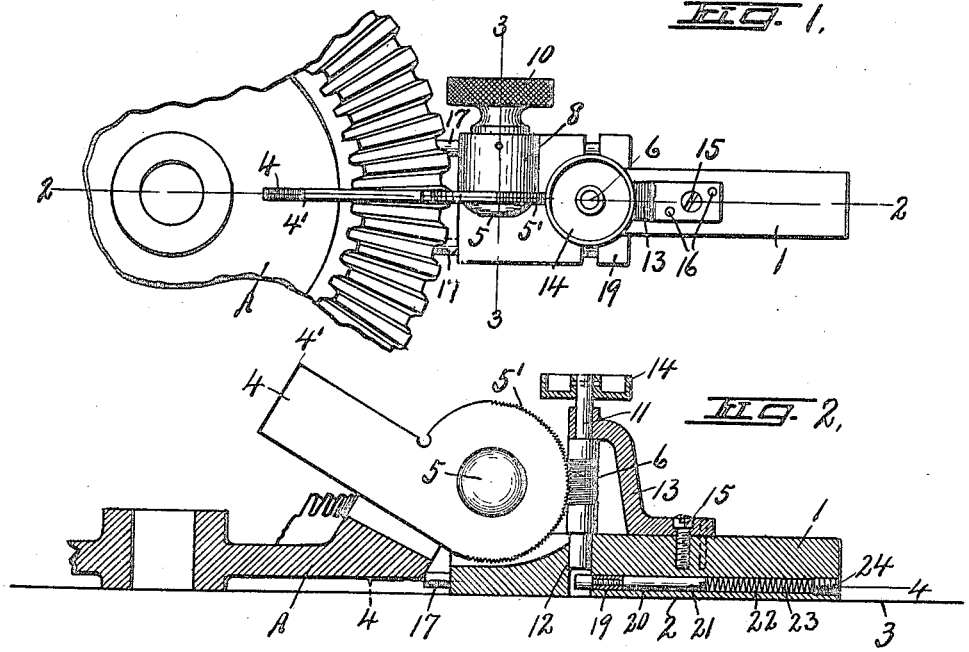

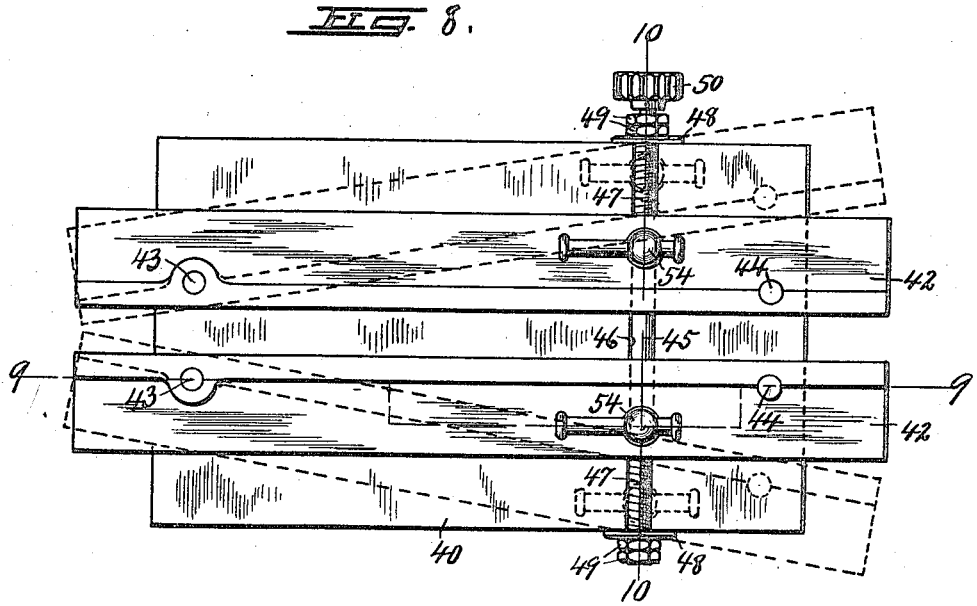
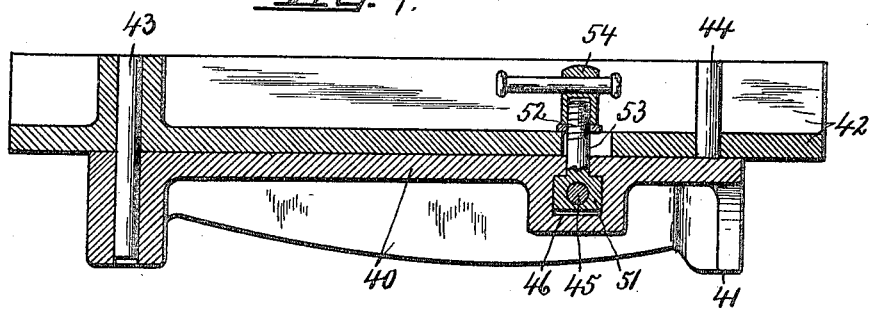
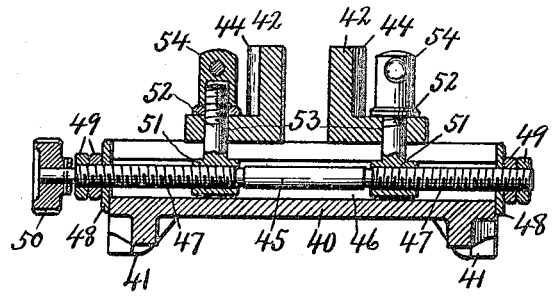

UNITED STATES PATENT OFFICE.

JOHN M. WALL AND CHARLES MELDRUM, OF SYRACUSE, NEW YORK.

TAPER AND ANGLE GAGE.

1,384,221.    Specification of Letters Patent.    Patented July 12, 1921.

Application filed April 23, 1917. Serial No. 163,949.

*To all whom it may concern:*

Be it known that we, JOHN M. WALL and CHARLES MELDRUM, citizens of the United States of America, and residents of Syracuse, in the county of Onondaga, in the State of New York, respectively, have invented new and useful Improvements in Taper and Angle Gages, of which the following, taken in connection with the accompanying drawings, is a full, clear, and exact description.

This invention relates to certain improvements in taper and angle gages of the class set forth in our Patent No. 1,215,443, February 13, 1917, in that it involves the use of a pivoted arm adjustable about the axis of the pivot relatively to a base line and provided with a straight edge in or parallel with a line radial to said axis for contact with the beveled or tapered surface, the angle of which is to be measured, in combination with means for adjusting and setting said arm to the angle to which the work is to be beveled or tapered, or to determine the angle of the finished work.

The primary object is to provide a simple device of this character whereby the angle of a bevel or taper may be determined by a micrometer measurement of the sine of the arc through which a certain point in the radius of the arm is adjusted so that the angle corresponding to that sine may be accurately determined from a sine table, or, on the other hand, the device may be set to any predetermined angle within its range of adjustment by obtaining the sine corresponding to that angle and then adjusting the arm until the micrometer measurement from the point therein referred to to the base line corresponds to such sine, the first setting being used to determine the angle of finished work, while the second setting may be used to engage the angle of the work to be finished.

Other objects and uses relating to specific parts of the apparatus will be brought out in the following description.

In the drawings—

Figure 1 is a top plan of a simple form of our invention for measuring the angles of bevel gears and similar objects, a portion of a bevel gear being shown in position for measuring such angle.

Fig. 2 is a longitudinal vertical sectional view of the same device taken on line 2—2, Fig. 1, Fig. 3 is a transverse sectional view taken on line 3—3, Fig. 1.

Fig. 4 is a horizontal sectional view taken in the plane of line 4—4, Fig. 2.

Fig. 5 is a top plan of a micrometer measuring device adapted to be used in connection with the device shown in Fig. 1 for measuring the angle of adjustment of the pivoted arm relatively to a base line.

Fig. 6 is an end face view, partly in section, of the device shown in Fig. 5.

Fig. 7 is a vertical sectional view taken on line 7—7, Fig. 5, showing the micrometer gage in operative position for measuring the angular adjustment of the pivoted arm.

Fig. 8 is a top plan of a modified form of our invention, as used more particularly for measuring tapers.

Fig. 9 is a longitudinal sectional view of the same device taken on line 9—9, Fig. 8.

Fig. 10 is a transverse sectional view taken on line 10—10, Fig. 8.

The apparatus shown in Figs. 1 to 7, inclusive, comprises a base plate —1— having a flat face —2— adapted to rest upon a surface plate, as —3—, an arm —4— pivoted at —5— to the base plate —1— to swing in a plane at right angles to the surface —2— and provided with a worm gear segment —5′— adapted to be engaged by a worm —6— for adjusting the arm to different angles about its axis and holding it in its adjusted position, and a micrometer gage —7— for determining the degree of adjustment of a certain point on the arm —4— to and from a base line, as for example the plane of the surface —2—, or surface plate —3— at right angles to such surface so that the line of measurement from said point to the base line will include the sine of the arc through which the point in the arm —4— is adjusted, all of the parts being made of hardened tool steel or equivalent metal to better resist wear incidental to their use, and thereby maintain a more permanent degree of accuracy.

The pivotal bolt —5— is passed through an upstanding lug —8— on the base plate —1— and is provided at one end with a head —9— engaging the outer side face of the adjacent portion of the arm —4— for holding said arm against the corresponding face of the lug —8—, the opposite end of the pivotal bolt —5— being threaded and engaged by a hand nut —10— which engages the opposite side of the lug for clamping the arm —4— in its adjusted position.

The worm —6— is secured to an upright spindle —11— having its lower end journaled in a suitable bearing —12— in the base plate —1— and its upper end journaled in a bracket —13— and provided with a knurled head —14— by which it may be rotated for moving the arm —4— to different angles about the axis of its pivot —5—, the bracket —13— being secured to the base plate —1— by means of a clamping screw —15— and suitable pins —16—.

A pair of plungers —17— is yieldingly mounted in spaced relation in parallel guide openings —18— in the base —1— to normally project out the same distance beyond the front end of the base plate, the opposite ends being secured to a sliding block —19— which is movable in a slot —20— in the base —1— and is provided with a central stem —21— movable in an opening —22— in the base against the action of a retracting spring —23— which is held against endwise displacement by a screw plug —24— in the outer end of the opening —22—, as shown clearly in Figs. 2 and 4.

These plungers —17— constitute what may be termed yielding centering pins arranged equal distances at opposite sides of the plane of movement of the arm —4— for engaging the periphery of circular work, as a bevel gear —A— to automatically adjust the arm —4— radially thereto in the operation of testing the angle of inclination of the teeth of the gear relatively to the base line —3—.

When the arm —4— has been set to correspond to the angle or taper of an object, and it is desired to ascertain such angle, the micrometer measuring device —7— is placed upon the surface plate —3— or upon an auxiliary surface plate —3'—, shown by dotted lines in Fig. 7, so that the blade or arm —4— will enter a vertical slot —25— in the base or frame of said measuring device with a certain point as —4'—, in the radius thereof directly under an adjustable contact member or spindle —26— of the micrometer gage, said spindle being threaded in an upright bushing —27— on the top of the frame, as —7'—, and has its upper end connected to a revoluble barrel member —28— which is rotatable around and upon a cylindrical sleeve —29— on the bushing —27—, the sleeve having a vertical scale —30— coöperating with a scale —31— on the lower end of the barrel —28— to enable the operator to take readings of the vertical adjustment of the stem or spindle —26— relatively to the base line, or to a plane passing through the axis of movement of the arm —4— parallel with said base line.

In the micrometer measuring device shown, the lower surface of the frame is relatively broad and flat and disposed in a plane at right angles to the axis of the spindle —26— and barrel —28— so that when it is supported upon the face of the surface plate —3— and the barrel —28— and spindle —26— are adjusted to their zero positions, as indicated on the scales —30— and —31—, the lower end of the spindle —26— will be the same distance from the upper face of the surface plate as the distance between said face and axis of movement of the arm —4—; that is, said axis and lower end of the spindle —26— will be in the same horizontal plane parallel with the upper face of the surface plate —3—.

The upper edge of the blade in which the point —4'— is located is straight and radial to the axis 5, while the opposite or lower edge is also straight and parallel with the upper radial edge to permit both edges to be used for testing or measuring internal bevels or tapers, the point —4'— being located a predetermined distance from the axis of the arm —4— and represents the radius of the arc through which said point is movable, while the distance between said point and the horizontal plane of the axis of movement of the arm —4— perpendicular to said plane represents the sine of such arc so that when the base of the micrometer gage rests upon the surface plate —3— and the blade —4— is adjusted to any angle within the range, as one inch, of the scale —30— with the point —4'— directly under the lower end of the spindle —26— and the latter is adjusted to contact with said point, the scales —30— and —31— will show in thousandths of an inch the distance of said point from the horizontal plane of the axis of the arm —4—, which distance will be the sine of the arc through which the point —4'— has been adjusted from its normal or zero position, and by referring to a specially prepared table of sine factors and angles will give the angle at which the arm —4— has been adjusted.

In like manner any angle to which the arm —4— may be adjusted may be accurately ascertained by simply measuring the distance from the point —4'— to the horizontal plane of the axis of movement of said arm, and then referring to the same distance and corresponding angle on the table and inversely obtaining the distance from the angle of the same table if the arm —4— is set to a known angle of any object.

The accuracy of said angle may be tested by the micrometer gage by simply adjusting the spindle —26— until its lower end contacts with the point —4'—, whereupon the reading on the scales —30— and —31— will show whether or not it is in correspondence with the tabulated measurements and angles.

If the angle to which the arm —4— has been adjusted exceeds that within the range of the scale —3— when the micrometer gage is resting upon the surface plate —3—, a supplemental surface plate, as —3'— of known thickness, as one inch, may be used to support the micrometer gage at the proper height to allow the measurement to be made by the adjustment of the spindle —26— to the point —4'—, in which case the known thickness of the block —3'— would simply be added to the reading of the micrometer scales.

The opposite ends of the sleeve —27— are preferably split longitudinally to enable it to be compressed upon the screw spindle —26— by nuts —32— engaging external threads on said ends, the object of which is to frictionally hold the screw in its adjusted position.

A bushing —33— is tightly fitted in the upper end or head of the frame —7'— to form a bearing for the inclosed portion of the sleeve —27— and is held in place by a set screw —34—, said bushing and sleeve, together with the adjacent portion of the frame —7'— opposite the set screw —34'— being provided with registering openings for receiving a clamping screw —35— and a clamping member —36— adapted to bear against the adjacent portion of the spindle —26— to lock it against rotation when desired.

The modification shown in Figs. 8, 9 and 10 is adapted more particularly for measuring tapers, but, as will hereinafter appear, may be used for measuring beveled or angular objects, and comprises a rectangular base plate —40— having supporting feet 41 at the four corners thereof and its upper face flat and normally disposed in a horizontal plane for receiving and supporting a pair of similar oppositely disposed arms —42— which extend lengthwise of and preferably beyond opposite ends of the plate in spaced relation equal distances from a medial or base line on said plate and pivoted at —43— to and near one end of the plate and are provided near their opposite ends with pins —44— at a definite or predetermined distance of, say one foot, from their respective pivots —43—, which distance constitutes a known radius of the arc through which the pins are movable.

A rotary spindle —45— extends transversely of the plate —40— within a transverse opening —46— and is provided with oppositely threaded ends —47— extending outwardly beyond the longitudinal edges of said plate through washers —48— which bear against the side faces of the plate, the outer threaded ends being engaged by nuts —49— coöperating with the washers —48— to hold the spindle against endwise movement, and at the same time permitting it to rotate freely, one end of the spindle being provided with a hand wheel —50— by which it may be turned.

The threaded ends —47— within the opening —46— are engaged by a pair of nuts —51— having upwardly projecting threaded stems —52— which pass through slots —53— in the corresponding arms —42—, the upper ends of said threaded stems being engaged by clamping nuts —54— for locking the arms in their adjusted positions.

The nuts —51— and their stems —52— serve as connections between the oppositely threaded screws —47— and their respective arms —42—, so that the rotation of the spindle in one direction or the reverse will cause the arms —42— to rock about their axes in opposite directions;—that is toward or from each other, each at the same angle to the medial or base line.

The arms —42— are preferably made in the form of angle bars or L-shape in cross section and are reversely arranged with their base flanges resting upon and movable across the upper surface of the base plate —40— and their upright flanges facing each other to receive between them articles of various thickness, the tapers or angles of which are to be measured.

For this purpose, the opposite longitudinal edges of each bar are straight and parallel for measuring interior or exterior angles and tapers, the outer faces of the upright flanges being also straight and radial to the axes of their respective pivots —43— and pins —44—.

The distance between the axes of the pivot —43— and pin —44— of each arm or bar —42— constitutes a radius factor of known length of the arc through which the axis of the pin —44— is movable, while the sine factor of said arc is to be determined by micrometer measurement.

The pins —44— are circular in cross section and of the same known radius and extend from the lower horizontal flanges to the upper edge of the upright flanges so that their outer faces project beyond the planes of the outer faces of said upright flanges to permit the use of a micrometer gage to contact therewith for measuring the distance from the outer face of one pin to the outer face of the other pin along the chord of the arcs through which the centers of said pins are moved.

The distance between the centers or axes of the pins —43— and therefore between the centers of the pins —44— when in their normal position is also known so that in order to obtain the unknown factor necessary to compute the sine of the angle of adjustment of either arm —42— from its normal position, it is simply necessary to divide the micrometer measurement by two and deduct one-half of the known distance between the centers of the pins —43— plus the radius of either pin —44—, and by referring to a table of sines the angle corresponding to that sine will be the angle of said adjustment, it being understood that the tapered object to be measured is placed lengthwise between the adjacent faces of the arms —42— with its axis parallel with or in the same plane as the medial line between said faces and below the upper edges thereof and all points in the length of diametrically opposite sides of the taper in contact with said faces, whereupon the micrometer reading and deductions, previously referred to, will give the exact sine of the angle of the taper and enable the operator to obtain the exact angle corresponding to such sine from the sine table.

Although we have shown and described certain forms of devices for measuring the angles and tapers of beveled and tapered objects, it is evident that they may be applied to any other uses where a high degree of accuracy in the measurement of angles may be required, and that the construction may be varied according to the different uses without departing from the spirit of this invention. The term "sine of the arc," as herein used, refers to the perpendicular distance from the point —4'— to the horizontal plane of the axis of the arm —4—, or one-half the chord of double the arc through which the point —4'— moves from its zero position.

What we claim is:

1. In a taper gage, the combination of a support having a straight surface, an arm pivoted to said support to swing in a plane at right angles to said surface and provided with a straight edge radial to its pivotal axis and means for adjusting the arm about said axis and for holding it in its adjusted position, said straight edge having a point therein a known distance from said axis from which the sine of the arc in which the arm is set may be measured.

2. In a taper gage, the combination of a support having a straight surface, an arm pivoted to said support to swing in a plane at right angles to said surface, said arm having a point therein a known distance from its pivotal axis from which the sine of the arc in which the arm is set may be measured, and means including a screw for adjusting said arm about said axis and for holding it in its adjusted position.

3. In a taper gage, the combination of a support having a straight surface, an arm pivoted to said support to swing in a plane at right angles to said surface and provided with parallel straight edges one of which is radial to the pivotal axis, the other straight edge being adapted to contact with the object the angle of which is to be measured, the first named straight edge having a point therein in a known distance from said axis from which the sine of the arc in which the arm is set may be measured.

4. In an angle measuring device the combination of a base and a sine arm pivoted thereto to swing vertically and provided with a contact point a known distance from its pivotal axis, and means for measuring the perpendicular distance from the horizontal plane of said axis to said point, whereby to establish with a known distance of the point from said axis, factors for determining the angle of adjustment of the arm, said arm having a worm gear segment concentric with its axis of movement, and a tangent screw mounted on the base for engaging with said segment for adjusting the arm and holding it in its adjusted position.

5. In an angle measuring device the combination of a base and a sine arm pivoted thereto to swing vertically and provided with a contact point a known distance from its pivotal axis, and means for measuring the perpendicular distance from the horizontal plane of said axis to said point, whereby to establish with a known distance of the point from said axis, factors for determining the angle of adjustment of the arm, and a pair of work centering pins mounted on the base at opposite sides of the plane of movement of said arm.

6. In an angle-measuring device of the character described, the combination of a base plate having a straight bearing face adapted to rest upon a surface plate, an angle-measuring arm pivotally mounted upon the base plate to swing in a plane perpendicular to said bearing face and provided with a contact point a known distance from its axis of movement from which the sine of the angle of adjustment of the arm may be measured, and yielding means on the base plate for engaging the edge of the object, the angle of which is to be measured.

7. In an angle-measuring device of the character described, the combination of a base plate having a straight bearing face adapted to rest upon a surface plate, an angle-measuring arm pivotally mounted upon the base plate to swing in a plane perpendicular to said bearing face and provided with a contact point a known distance from its axis of movement from which the sine of the arc of adjustment of said point may be measured, and contact members mounted on the base plate in spaced relation equal distances from and at opposite sides of the plane of movement of said arm for engaging and centering the work.

8. In a taper and angle gage, the combination of a pivoted sine-arm, a support therefor and contact members on the support spaced equal distances from and at opposite sides of the plane of movement of the sine-arm for engaging the object, the angle of which is to be measured.

9. In a taper and angle gage, the combination of a supporting base, an angle-measuring arm pivoted to said base and having a toothed segment in the plane of movement of the arm, and concentric with the pivot of said arm and a screw on said base coöperating with said segment to adjust the arm to different angles.

10. In a taper and angle gage, the combination of a supporting base, a sine-arm pivoted to the base and provided with a contact point a known distance from and at one side of its pivot and a toothed segment concentric with the pivot of said arm at the opposite side of the pivot, and a screw on said base parallel with the sine of the arc of movement of said arm engaging the segment for adjusting the arm to different angles.

11. In a taper and angle gage, the combination of a supporting base, a pivoted sine-arm having a point a known distance from one side of its axis and a worm gear segment at the opposite side of said axis, and a screw parallel with the sine of the arc of movement of the arm and engaged with said segment for adjusting the arm to different angles.

In witness whereof we have hereunto set our hands this 19th day of April, 1917.

JOHN M. WALL.
CHARLES MELDRUM.

Witnesses:
H. E. CHASE,
ALICE M. CANNON.